United States Patent
Nishimura

[11] 3,742,759
[45] July 3, 1973

[54] MECHANICAL STRESS DETECTING DEVICE

[76] Inventor: Kazuo Nishimura, c/o Kabushiki Kaisha Meidensha, No. 2-1-17, Osaki, Shinagawa-ku, Tokyo, Japan

[22] Filed: Nov. 13, 1970

[21] Appl. No.: 89,175

[30] Foreign Application Priority Data
Dec. 3, 1969 Japan..................... 44/96924
Oct. 14, 1970 Japan..................... 45/90209

[52] U.S. Cl. ................ 73/141 A, 73/DIG. 2
[51] Int. Cl. ............................... G01l 1/12
[58] Field of Search............ 73/DIG. 2; 336/20, 336/218

[56] References Cited
UNITED STATES PATENTS
2,895,332   7/1959   Dahle et al. ............... 73/141 A
2,569,468   10/1951  Gaugler ..................... 336/233 X
2,906,979   9/1959   Bozorth ..................... 336/218
3,034,935   5/1962   Walter et al. .............. 336/218 UX
3,125,472   3/1964   Yamamoto et al. ......... 336/218 UX
3,158,516   11/1964  Walter et al. .............. 336/218 UX
3,307,405   3/1967   Stucki ........................ 73/398 R Primary Examiner—Charles A. Ruehl
Attorney—Kelman & Berman

[57] ABSTRACT

A device for detecting a mechanical stress which comprises a stock of closely laminated magnetic plates, a pair of non-magneitc retaining plates securely mounted on both ends of the stack of the magnetic plates by means of bolts so as to form a core, four apertures extending through the core an exciting coil passing through a first pair of the apertures and a detecting coil through a second pair of the apertures, the planes of the coils being normal to each other and wherein the core has a monoaxial magnetic anisotropy established by energizing a magnetizing coil passed through said first pair of apertures while the temperature of the stack decreases from the Curie point of the magnetic material.

4 Claims, 12 Drawing Figures

PATENTED JUL 3 1973 3,742,759
SHEET 1 OF 2
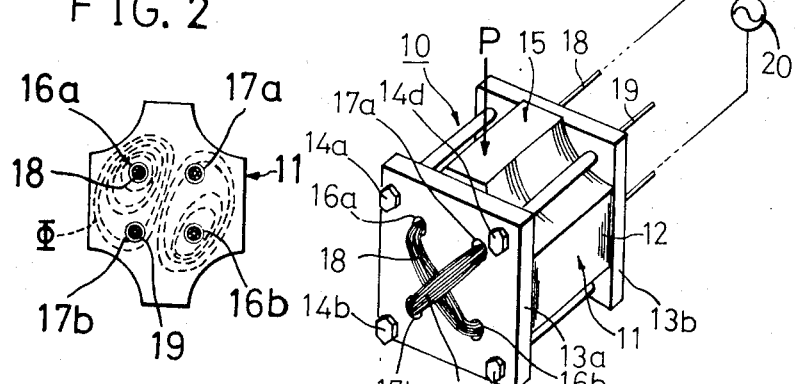
FIG. 2
FIG. 1
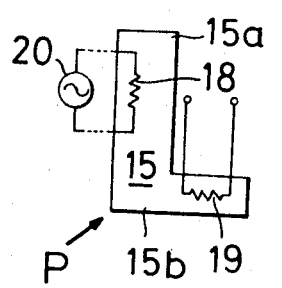
FIG. 3
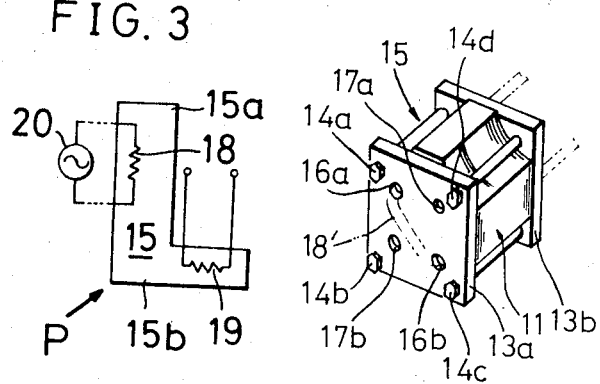
FIG. 4
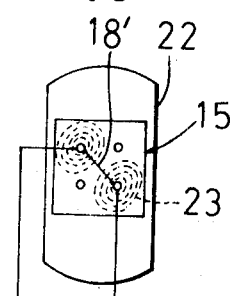
FIG. 5
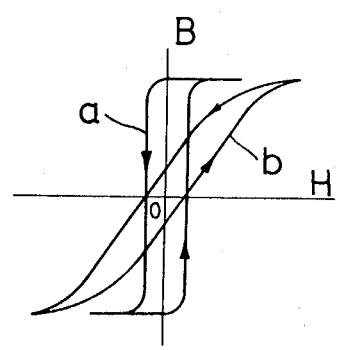
FIG. 6
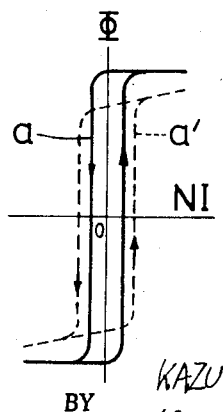
FIG. 7
INVENTOR.
KAZUO NISHIMURA
BY Kelman and Berman
Agents

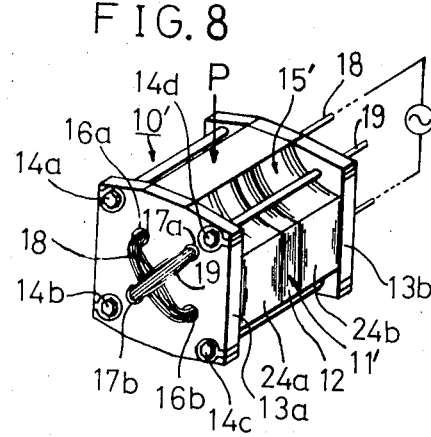
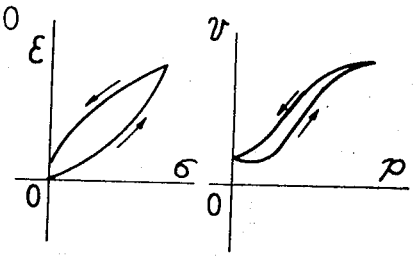
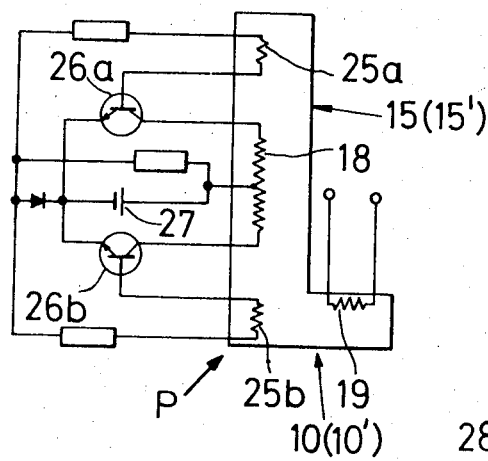
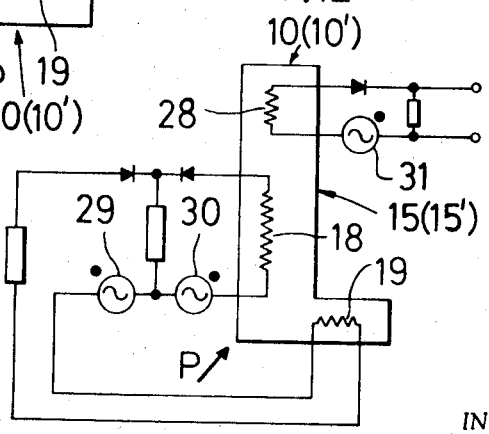

MECHANICAL STRESS DETECTING DEVICE

The present invention relates generally to a device for detecting and measuring a mechanical stress or pressure and, more particularly, to a device which is adapted to convert a mechanical stress or pressure into a corresponding variation in an electrical quantity representative of a magnetostrictive force in a magnetic material.

The device to which the present invention is directed is basically of the type which is disclosed in the Japanese Patent Publication No. 31-495 issued under the date of Jan. 27, 1947. The device described therein comprises a plurality of closely laminated magnetic plates and a pair of retaining or side plates which are securely mounted on both ends of the stack of the laminated magnetic plates by means of bolts. The magnetic plates and the sides plates form a magnetic core. Four separate apertures extend through the magnetic core. The apertures are spaced at 90° from each other so that there are two pairs of apertures which are opposite to each other. An exciting coil is passed through a first pair of opposite apertures and a detecting coil is passed through a second pair of opposite apertures. The exciting coil and the detecting coil are thus in a crossing relationship on both sides of the magnetic core. The exciting coil is connected to a source of an ac power. For measurement of a mechanical stress, the load is applied to the magnetic core in a direction perpendicular to the direction of thickness of the laminated magnetic plates, viz., at an angle of about 45° to the intersecting planes of the exciting and detecting coils, whereby a signal having a magnitude which is indicative of the load applied to the magnetic core is produced from the detecting coil.

The magnetic core to be used in this type of detecting device is generally made of a material which is magnetically non-directive or mechanically undistorted. If, in this instance, a magnetically directive material is used, then the resultant magnetic core is most responsive to the applied load in the direction in which the direction of the spontaneous magnetization or of the monoaxial magnetic anisotropy is 45° to the direction of the load applied.

The material for the magnetic core is usually produced by two different methods, one being cold rolling and the other being cooling in a magnetic field.

The cold-rolled magnetic material is so thin that the magnetic core made up of the laminated plates of such thin material can not be free from deformation due to application of a load in a direction perpendicular to the direction in which the plates are laminated on each other. Where a pair of retaining plates are secured to both ends of the stack of the laminated magnetic plates by means of bolts or other suitable tightening means, the magnetic core is subject to a mechanical distortion under the pressure exerted from the side plates. If it is desired to remove such mechanical distortion by heating the magnetic core, the monoaxial magnetic anistropy which has been attained through cold rolling is impaired and, as a result, the magnetic core is no longer acceptable for use in the detecting device of the type to which the present invention appertains.

When, on the other hand, a certain type of magnetic material such as for example a sufficiently deoxidized permalloy containing about 63 percent nickel is cooled in a magnetic field to about 250° C from a temperature approximately the Curie point such as about 600° C, then the crystal magnetic anistropy of the cubic crystals is caused to disappear if the magnetic material is cooled at a selected rate such as about 10° C/hour and a monoaxial magnetic anistropy is induced in the direction of the magnetic field which has been built up at the more elevated temperature. As the cooling proceeds, the individual magnetic domains are oriented and fixed in the direction of the magnetic field in which the magnetic material is placed. Where a plurality of magnetic plates of the thus produced monoaxial magnetoanistropic material are laminated into a unitary block and a pair of side plates are mounted under pressure on both sides of the block of the laminated plates so as to form an integral magnetic core, a mechanical strain is produced in the magnetic core similarly to the magnetic core made up of laminated plates manufactured by cold rolling.

The present invention, therefore, contemplates solving this and other problems and an important object of the present invention is to provide a device for detecting a mechanical stress or pressure, wherein the magnetic plates are of considerable thickness and are sandwiched rigidly by a pair of side plates and by bolts while internal stresses are avoided in the laminated magnetic plates. Thus, the mechanical stress detecting device according to the present invention is robust in construction, economical to manufacture and simple in operation.

Another important object of the present invention is to provide a mechanical stress detecting device in which a mechanical stress or pressure is converted precisely into a corresponding variation in an electrical quantity through utilization of the monoaxial magnetic anistropy which is attained by cooling the magnetic material in a magnetic field.

Still another important object of the present invention is to provide a mechanical stress detecting device having performance characteristics which are so stabilized that the device can operate at all times in a satisfactory state irrespective of the variation in the load applied thereto.

Still another object of the present invention is to provide a mechanical stress detecting device which can be usable as a saturable reactor which, when combined with suitable electronics elements such as semiconductor devices, finds applications in oscillators and amplifiers, because of the fact that the performance characteristics of such saturable reactor are not impaired during application of a mechanical stress to the magnetic core.

The detecting device achieving these objects features an improved responsiveness to load as compared with a mechanical counter-balance and a reduced dependency upon the load distribution as compared with a strain-gauge.

Other objects, features and advantages of the device according to the present invention will be more clearly understood upon perusal of the following description taken in conjunction with the accompanying drawings, in which:

FIG. 1 is a perspective view of a mechanical stress detecting device according to a first embodiment of the present invention;

FIG. 2 is a side elevation of a stack of magnetic plates forming part of the device shown in FIG. 1;

FIG. 3 is a schematic view showing an equivalent electric circuit of the device illustrated in FIG. 1;

FIG. 4 is a perspective view showing a magnetic core ready to be placed in a heating oven for field-cooling;

FIG. 5 is a schematic view showing the conditions in which the magnetic core shown in FIG. 4 is being cooled in a magnetic field;

FIG. 6 is a graphic view showing dc magnetization characteristics curves of the magnetic plate produced in the cooling process of FIG. 5;

FIG. 7 is also a graphic view showing the variation in the magnetization characteristics of the magnetic plate caused by application of a mechanical stress to the magnetic plate;

FIG. 8 is similar to FIG. 1 but illustrates a modified form of the device according to this invention;

FIG. 9 is a graphic view showing a mechanical hysteresis loop of an elongation varying as a function of a mechanical stress;

FIG. 10 is a graphic view showing an electrical hysteresis loop of an electric output varying as a function of a mechanical stress; and FIG. 11 and 12 are schematic views showing examples of the practical application of the device according to this invention.

Reference is now made to the drawings, more specifically to FIGS. 1 and 2 which show a first preferred embodiment of the present invention.

As illustrated, the device 10, includes a stack 11 of closely laminated magnetic plates 12 of contoured configuration. The magnetic plates 12 are herein shown to have inwardly curved corners. A pair of substantially identical retaining plates 13a, 13b of non-magnetic material are securely mounted on the first and last plates of the stack 11 by means of suitable rigid fastening means such as bolts 14a, 14b, 14c, 14d as shown. The stack 11 of the magnetic plates 12 and plates 13a, 13b attached thereto thus form a magnetic core which is generally represented by reference numeral 15 in FIG. 4.

The magnetic core 15 thus formed has four apertures 16a, 16b and 17a, 17b which extend through the stack 11 between the plates 13a, 13b in the direction of thickness of the plates as best seen in FIG. 4. The apertures 16a, 16b and 17a, 17b are symetrically spaced from each other at an angle of about 90° and are disposed in such a manner that the two, rectangularly intersecting planes respectively defined by the pairs of apertures are angled at about 45° to the direction in which a mechanical stress or load P is applied to an exposed face of the magnetic core 15 as indicated by an arrowhead in FIG. 1. Two separate coils 18, 19 are passed through the respective diametrically opposite pairs of the apertures 16a, 16b and 17a, 17b. More specifically, an exciting coil 18 is passed through the apertures 16a, 16b and a stress detecting coil 19 is passed through the apertures 17a and 17b. The exciting and stress detecting coils 18 and 19, respectively, thus cross each other on the outer surface of the plates 13a at an angle of about 45° to the direction of the mechanical stress or load P. Designated by reference numeral 20 is a source of alternating current, which is connected to the exciting coil 18 to energize the same.

An equivalent electric circuit of the device constructed as shown in FIG. 1 is illustrated in FIG. 3, wherein the L-shaped section 15 corresponds to the magnetic core 15 which has a monoaxial magneto-anistrophy established through cooling the magnetic core 15 in a magnetic field. The relatively broad vertical portion 15a of the L-shaped section 15 indicates a plane of coiling established by the exciting coil 18, which plane of coiling is identical with the magnetizing winding plane built up when cooling the magnetic core in a magnetic field. The magnetic characteristics resulting from this magnetizing plane of coiling is indicated by a hysteresis loop $a$ of FIG. 6 which illustrates variations of a magnetic force H as a function of an ideal flux density B. The relatively thin horizontal portion 15b of the L-shaped section 15 in FIG. 3, on the other hand, indicates a plane of coiling established by the stress detecting coil 19, viz., a plane of coiling which is normal to the magnetizing plane of coiling. The magnetic characteristics resulting from the plane of coiling of the detecting coil 19 are Isoperm characteristics as indicated by a hysteresis loop $b$ of FIG. 6.

The mechanical stress detecting device according to the present invention as described above is produced in the following manner. A plurality of magnetic plates 12 are first laminated upon one another with their four apertures 16a, 16b and 17a and 17b aligned. The plates 13a and 13b are rigidly attached to both ends of the resultant stack 11 by the aid of the bolts 14a, 14b, 14c, 14d thereby to form the magnetic core 15.

A magnetizing coil 18' is then passed through the diametrically opposite pair of apertures 16a and 16b and is connected to a dc source 21, as schematically illustrated in FIG. 4 and FIG. 5. The magnetic core 15 with the magnetizing coil 18' is now placed in a heating oven 22 which is filled with a reducing atmosphere such as hydrogen gas. The magnetizing coil 18' is then energized from the dc source 21 with a predetermined dc magnetizing current which is independent from the thickness of the magnetic core 15, while slowly reducing the temperature in the heating oven 22 from about 600° C through the region of about 250° C at the rate of about 10° C per hours. The resultant magnetic core 15 is now provided with a monoaxial magnetic anisotropy. This magnetic core 15 is removed from the heating oven 22, whereupon the magnetizing coil 18' is removed from the magnetic core 15. The exciting coil 18 is now passed through the apertures 16a, 16b on the same plane of coiling as that of the magnetizing coil 18', while the stress detecting coil 19 is passed through the other diametrically opposite pair of apertures 17a, 17b.

In the method for producing the device according to the present invention, the magnetic core 15 is annealed while being cooled in the magnetic field and the internal stress of the magnetic core is removed and the plastic deformation of the integrally combined elements of the magnetic core is caused to add to the rigidity of the core. In the process of cooling the magnetic core 15 in the magnetic field, monoaxial magnetic anisotropy develops along the closed magnetic circuits 23 in the magnetic plates 12 forming the magnetic core, as illustrated in FIG. 5. The anisotropy is fixed in the magnetic core 15 as the magnetic core is cooled down. When, therefore, the magnetic core 15 is placed on use at a normal temperature, an easy magnetization axis is established only in a direction parallel to the closed magnetic circuits 23 so that the magnetic core 15 is capable of sensitivity responding to a mechanical stress or load.

FIG. 6 illustrates hysteresis loops of the magnetomotive force H relative to an ideal flux density B, wherein the loop $a$ indicates magnetizing characteristics of the exciting coil 18 and the loop $b$ indicates the magnetizing characteristics of the stress detecting coil 19 in a plane perpendicular to the plane of winding of the exciting coil 18. It will thus be appreciated that the cooling of the closely laminated magnetic plates in the magnetic-field established by the closed magnetic circuits is advantageous because the cooling effect is not influenced by the demagnetizing field and, consequently that the cooling in the magnetic field can be carried out witnout respect to the thickness of the magnetic core 15 so as to permit the use of a relatively low magnetizing current.

When, in the device according to the present invention, the exciting coil 18 is energized from the ac power source 20 with a stabilized ac voltage of a square or sinusoidal waveform and a mechanical stress is applied to the magnetic core 15, the magnetizing characteristics of the ampere-turns NI with respect to the magnetic flux $\phi$ shifts from the square hysteresis loop $a$ of FIG. 7 (which corresponds to the hysteresis loop $a$ of FIG. 6) to the square hysteresis loop $a'$ of FIG. 7 indicated by a dotted curve. Since, however, the saturability characteristics are practically not impaired, the magnetic core 15 can be used satisfactorily as a saturable reactor as will be discussed later. When, moreover, a stabilized ac voltage having a square or sinusoidal waveform is applied to the exciting coil 18 of the device according to the present invention, the quantity of the flux linking the detecting coil 19 during application of a mechanical stress to the magnetic core 15 is far greater than that available in a device using a magnetic core which is magnetically non-directive or free from mechanical stress or which has irregular domain distribution. The detecting device according to the present invention is, therefore, capable of providing a high apparent magnetostrictive sensitivity which is reflected by an increased output voltage to be delivered from the stress detecting coil 19. This means that an improved stress detecting device is provided by the present invention which reduces the load to be applied to the operating electric circuit to be used in connection with the detecting device and which provides an increased signal-to-noise ratio.

When, in operation, the exciting coil 18 is excited from the ac power source 20 with a stabilized ac voltage having a sinusoidal or square waveform and the mechanical stress to be measured is applied to the magnetic core 15 in the direction P in FIG. 1, then the flux $\phi$ induced by the current flowing through the magnetizing coil 18 is distorted and consequently caused to intersect with the stress detecting coil 19 so that a voltage proportional to the applied mechanical stress is produced by the stress detecting coil 19. The mechanical stress can be measured from the voltage thus obtained.

FIG. 8 now illustrates a modified form of the stress detecting device according to the present inVention. The modified mechanical stress detecting device 10' includes a stack 11' of closely laminated magnetic plates 12 and a pair of load-sharing members 24a and 24b each of which is made up of a plurality of laminated plates of a non-magnetic material and which are mounted on both sides of the laminated magnetic plates. A pair of retaining plates 13a, are securely mounted on both ends of the thus constructed stack 11' by means of bolts 14a, 14b, 14c, 14d as illustrated. The stack 11' of the laminated magnetic plates 12 and the load-sharing members 24a and 24b thus form a magnetic core 15'.

The magnetic core 15' thus constructed has four apertures 16a, 16b and 17a, 17b which extend through the the laminated magnetic plates 12 and the load-sharing members 24a and 24b. The apertures 16a, 16b and 17a, 17b are symmetrically spaced from each other at an angle of about 90° and are disposed in such a manner that the two intersecting planes defined by the diametrically opposite two pairs of the apertures are angled at about 45° to the direction of the load P to be applied to the magnetic core 15' as indicated by an arrowhead in FIG. 8. An exciting coil 18 is passed through one diametrically opposite pair of the apertures 16a, 16b and a stress detecting coil 19 is passed through the other diametrically opposite pair of the apertures 17a, 17b. The exciting and detecting coils 18 and 19, respectively, thus cross each other on the outer surface of the side plate 13a at an angle of about 45° to the direction of the load P. The modified mechanical stress detecting device shown in FIG. 8 is thus essentially similar to the device shown in FIG. 1 except for the provision of the load-sharing members 24a and 24b and, as such, the modified device has an electric circuit equivalent to the circuit shown in FIG. 3. Furthermore, the magnetic core 15' of the modified stress detecting device has a monoaxial magnetic anisotropy which is attained by cooling the magnetic anistropy which is attained by cooling the magnetic core in a magnetic field, similarly to the device shown in FIG. 1.

The device shown in FIG. 8 is, according to the present invention, produced in the following manner. A plurality of magnetic plates 12 are first laminated upon each other, and the load-sharing members 24a, 24b, much thicker than the individual plates 12, are attached to the first and last laminated magnetic plates 12 so as to form a stack 11'. The retaining plates 13a and 13b are then mounted securely on both ends of the stack 11' by means of the bolts 14a, 14b, 14c, 14d, thereby constituting a magnetic core 15'. The magnetic core 15' has formed therein four apertures 16a, 16b and 17a, 17b which are disposed in a manner previously discussed.

A magnetizing coil 18' is passed through the diametrically opposite pair of the apertures 16a, 16b and is connected to a dc power source 21 as schematically illustrated in FIG. 5. The magnetic core 15' thus provided with the magnetizing coil 18' is placed in a heating oven 22 which is filled with a suitable atmosphere such as hydrogen gas. The magnetizing coil 18' is then energized from the dc power source 21 with a predetermined magnetizing current which is independent from the thickness of the magnetic core 15', while reducing the temperature in the heating oven 22 through a region of about 250° C from about 600° C preferably at the rate of about 10° C per hour. The resultant magnetic core 15' has a monoaxial magnetic anisotropy. The magnetic core 15' is now removed from the heating oven 22, whereupon the magnetizing coil 18' is removed from the magnetic core 15'. The exciting coil 18 is then passed through the apertures 16a, 16b and thereafter the stress detecting coil 19 is passed through the apertures 17a, 17b. It is apparent that the device shown in FIG. 8 is capable of detecting as a voltage signal a considerably greater mechanical stress or pressure than the device shown in FIG. 1.

For the measurement of a great mechanical stress or pressure, it is generally required to use a magnetic core having a rigidity corresponding to the magnitude of such a great mechanical stress. To provide the magnetic core with desired characteristics as previously discussed, furthermore, the material to the usable as the magnetic core is necessarily limited to a costly material such as for example a 63 percent permalloy. The use of such a costly material in a large quantity is apparently objectionable from the economical point of view.

The provision of the load-sharing members 24a and 24b as in the embodiment shown in FIG. 8 is advantageous in this particular respect because only a limited number of magnetic plates 12 is used in combination with less costly non-magnetic plates forming the load-sharing members 24a and 24b. The material usable as the non-magnetic plates may be 18-8 stainless steel which is commercially readily available at a low cost. The number of the component plates of the load-sharing members may be selected according to the magnitude of the load to be applied to the magnetic core. The load-sharing members 24a, 24b not only reduce the production cost of the magnetic core but carry a portion of the load applied to the magnetic core so as to permit the quantitative detection of an increased mechanical stress or pressure. In this instance, the load-sharing members 24a, 24b may be said to act as a "shunt" in an electric instrument. For the measurement of a load of the order of 1 tons, a corresponding number of non-magnetic plates may be combined into the members 24a and 24b and for the measurement of a load of 10 tons, a correspondingly increased number of the non-magnetic plates may be used.

To save the load to be directly imparted to the laminated magnetic plates 12, it may be also advantageous to have the upper and lower edge faces of the side plates 13a, 13b flush with the exposed upper and lower exposed faces respectively, of the stack 11', as illustrated in FIG. 8. The load to be measured is shared not only by the stack 11' but by the plates 13a, 13b so as to reduce the load to be imparted to the laminated magnetic plates 12. This is also desirable because the mechanical hysteresis due to the load cycles, viz., the hysteresis of the elongation $\epsilon$ varying with the mechanical stress $\phi$ as shown in FIG. 9 and accordingly the electrical hysteresis of the voltage output $v$ as a function of the load $p$ as shown in FIG. 10 can be eliminated. Unless, therefore, the upper and lower edge faces of the plates 13a, 13b are flush with the exposed upper and lower faces, respectively, of the stack 11', then the retaining plates may not be functionally completely integral with the stack 11' with the result that an unusual shearing stress may be built up between the side plates 13a, 13b and the stack 11' of the laminated magnetic plates 12 and the load-sharing members 24a, 24b even though the load cycles are limited within the presumed limits of elasticity. Such unusual shearing stress will cause frictional heat between the plates 13a, 13b and the stack 11', resulting in the mechanical and electrical hystereses as above mentioned.

The stress detecting device constructed as shown in FIGS. 1 and 8 and providing the hereinbefore discussed outstanding features may find applications in various fields of the industry for the purpose of measuring various weights, pressures and other mechanical stresses. Only two examples of such practical applications of the device according to the invention will be described.

First referring to FIG. 11, the mechanical stress detecting device according to the present invention is used as a saturable reactor to form part of a Royer type self-exciting transistor inverter. The amplifier or self-exciting inverter per se is well known in the art, disclosed in the Japanese Patent Publication No. 32-4066 issued on June 22, 1957. To have the device according to the present invention incorporated in this type of self-exciting inverter, it is enough that the exciting coil 18 be intermediately tapped and that two coils 25a, 25b for making respective transistors 26a, 26b alternately conductive and non-conductive be passed through two apertures providing a plane of coiling which is identical with the plane of coiling of the exciting coil 19. The transistors 26a, 26b are made alternately conductive and nonconductive so as to continuously oscillate, whereby the dc voltage supplied from the source 27 of a stabilized dc source is converted into an ac voltage with a square waveform through utilization of the square hysteresis of the magnetic core 15 or 15'. The output ac voltage is delivered from the detecting coil 19. Thus, in the arrangement of FIG. 11, the ac voltage is produced through combination of a dc power source and two alternately operating transistors; such arrangement is therefore considered to be substantially equivalent to the circuit shown in FIG. 3. The self-exciting inverter shown in FIG. 11 will be used as a battery-powered portable load detector. Where, moreover, products are moved on a belt conveyor, the flow rate of the products may be monitored by the use of the detector constructed and arranged as illustrated in FIG. 11. If desired in this instance, a tachometric generator may be coupled with a conveyor driving motor so as to produce a signal dc voltage which is proportional to the travelling speed of the conveyor. If this signal voltage is used as the source of a dc voltage in the inverter of FIG. 11, then a signal voltage representing the product of the load applied to the belt conveyor and the travelling speed of the conveyor will be produced from the detecting coil 19, thus indicating the flow rate of the products on the belt conveyor.

FIG. 12 illustrates another example of the practical applications of the device according to the present invention, wherein the device is utilized as a saturable reactor to constitute a self-feedback type magnetic amplifier which is known per se. To use the device according to the present invention in the magnetic amplifier of this type, a gate coil 28 is passed through two apertures providing the same plane of coiling as the plane of coiling of the exciting coil 19 and the exciting and detecting coils 18 and 19 are used as reset and feedback coils, respectively. The bias magnetic field to reduce the magnetostrictivity and to increase the sensistivity is determined by the ratio of turns of the reset (or exciting) coil 18 and the gate coil 28 and by the ac voltages supplied from the sources 29, 30, 32 of ac power. If, now, a load is imparted to the magnetic core 15 or 15', the flux produced by the excitation of the reset coil 18 varies whereupon the ac voltage induced in the feedback (or detecting) coil 19 is converted into a dc voltage. The dc voltage produced in the feedback coil 19 is fed back to the reset coil 18 so that an amplified voltage which is proportional to the load detected is supplied.

Having thus described the mechanical stress detecting device implementing the present invention, it will now be apparent that, according to one important aspect of the present invention, the device according to the present invention is substantially free from an internal mechanical stress that would otherwise result from the tightening of the retaining plates on the stack of laminated plates by the use of the bolts and nevertheless can be constructed with a sufficient mechanical strength.

Now, it should be understood that the embodiments as hereinbefore described are merely for illustrative purposes and are not limitative of the present invention. Such embodiments and the practical applications thereof can be changed and modified in numerous manners without departing from the spirit and scope of the present invention which should be interpreted from the appended claims.

What is claimed is:

1. In a device for converting a mechanical stress to an electric quantity, the device including a stack of plates of magnetic material, two retaining plates on the first and last plate of said stack, elongated fastening members fixedly fastening said stack between said retaining plates, whereby said retaining plates and said plates of magnetic material constitute a continuous core, said core being formed with two pairs of openings extending therethrough in a direction from one retaining plate to the other retaining plate, each pair defining a plane intersecting the plane defined by the other pair at right angles, an exciting coil in the openings of one pair, and a detecting coil in the openings of the other pair and intersecting said exciting coil, said stack having monoaxial magnetic anisotropy, the improvement which comprises two load sharing members having each a thickness substantially greater than the thickness of each of said plates of magnetic material and interposed between said stack and said retaining plates respectively, said plates of magnetic material being in the fully annealed condition and substantially free from internal stresses.

2. In a device as set forth in claim 1, said load sharing members each consisting of a plurality of plate members superposed in said direction, said plates of magnetic material and said plate members being of the same configuration transverse of said direction.

3. In a device as set forth in claim 1, said load sharing members consisting of non-magnetic material.

4. In a device as set forth in claim 1, said stack having two exposed faces parallel to each other and to said direction, and said retaining plates having each two edge faces flush with said exposed faces respectively.

* * * * *

UNITED STATES PATENT OFFICE
CERTIFICATE OF CORRECTION

Patent No. 3,742,759         Dated July 3, 1973

Inventor(s) KAZUO NISHIMURA

It is certified that error appears in the above-identified patent and that said Letters Patent are hereby corrected as shown below:

In the title page, after line [76] insert

-- [73] Assignee: Kabushiki Kaisha Meidensha, Tokyo, Japan --

Signed and sealed this 29th day of January 1974.

(SEAL)
Attest:

EDWARD M. FLETCHER, JR.                RENE D. TEGTMEYER
Attesting Officer                       Acting Commissioner of Patents